United States Patent
Gu (10) Patent No.: US 10,998,632 B2
(45) Date of Patent: *May 4, 2021

(54) ANTENNA SYSTEM AND MOBILE TERMINAL

(71) Applicant: AAC Technologies Pte. Ltd., Singapore (SG)

(72) Inventor: Haichuan Gu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,041

(22) Filed: Jul. 27, 2019

(65) Prior Publication Data
US 2020/0044346 A1 Feb. 6, 2020

(30) Foreign Application Priority Data

Aug. 3, 2018 (CN) .......................... 201810876500.X (51) Int. Cl.
| | |
|---|---|
| *H01Q 5/50* | (2015.01) |
| *H01Q 5/335* | (2015.01) |
| *H04B 7/0413* | (2017.01) |
| *H01Q 5/328* | (2015.01) |
| *H01Q 1/24* | (2006.01) |

(52) U.S. Cl.
CPC ............. *H01Q 5/50* (2015.01); *H01Q 1/241* (2013.01); *H01Q 5/328* (2015.01); *H04B 7/0413* (2013.01)

(58) Field of Classification Search
CPC .. H01Q 5/00; H01Q 5/35; H01Q 5/50; H01Q 5/328; H01Q 5/335; H01Q 1/241–243; H04B 7/0413
See application file for complete search history.

(56) References Cited

U.S. PATENT DOCUMENTS

2018/0026333 A1* 1/2018 Lee .................. H01Q 13/18
343/702

FOREIGN PATENT DOCUMENTS

| CN | 109149086 A1 | 8/2016 |
|---|---|---|
| CN | 109149115 A1 | 1/2019 |

OTHER PUBLICATIONS

PCT search report dated Aug. 21, 2019 by SIPO in related PCT Patent Application No. PCT/CN2019/087543 (4 Pages).

* cited by examiner

*Primary Examiner* — Henry Luong
(74) *Attorney, Agent, or Firm* — W&G Law Group LLP (57) ABSTRACT

The present disclosure provides an antenna system and a mobile terminal. The antenna system comprises a metal frame, a main board received in the metal frame, and a first feeding point, a second feeding point, a first grounding point, a second grounding point, a third feeding point, a fourth feeding point, a third grounding point, a fourth grounding point, a first tuning switch, a second tuning switch, a first matching network, a variable capacitor, a third tuning switch, a fourth tuning switch, and a second matching network disposed at the main board. The metal frame is partitioned into a first radiating portion and a second radiating portion at the bottom and a third radiating portion and a fourth radiating portion at the top.

15 Claims, 13 Drawing Sheets

ANTENNA SYSTEM AND MOBILE TERMINAL

TECHNICAL FIELD

The present disclosure relates to the field of communication technology, and in particular, to an antenna system and a mobile terminal.

BACKGROUND

With the development of mobile communication technology, mobile phones, PADs, notebooks, etc. have gradually become indispensable electronic products in life, and such electronic products have been updated into electronic communication products with communication functions by adding an antenna system thereto. However, consumers are no longer only satisfied with application functions of the electronic communication products, but the requirements for appearance thereof are also constantly increasing. The electronic communication products with metal casing and 3D glass screen have good texture and a sense of beauty and thus are popular with many consumers.

The terminal manufacturer's control on the length and thickness of mobile terminals, as well as the use of the metal casing, will occupy space of the antenna to a certain extent, and thus higher requirements for designing antennas are put forward. When designing an electronic communication product with metal casing, the antenna system generally has to be externally disposed or the antenna system is not surrounded by metal, such as slitting on a side of metal to facilitate radiation of the antenna system. However, the antenna system according to this design has a narrow frequency band and low efficiency. With reduction in size of mobile terminals and the requirements for multi-frequency multi-mode and other functions, the antenna system according to the related art cannot meet the development needs.

Therefore, it is necessary to provide a new antenna system to solve the above problems.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure, and to those skilled in the art, other drawings can be obtained according to these drawings without any creative work, wherein.

DETAILED DESCRIPTION

The technical solutions in the embodiments of the present disclosure will be clearly and completely described in conjunction with the drawings in the embodiments of the present disclosure. It is obvious that the described embodiments are just a part but not all of the embodiments of the present disclosure. All other embodiments obtained by those skilled in the art based on the embodiments of the present disclosure without creative efforts would fall within the scope of the present disclosure.

Figure 1:
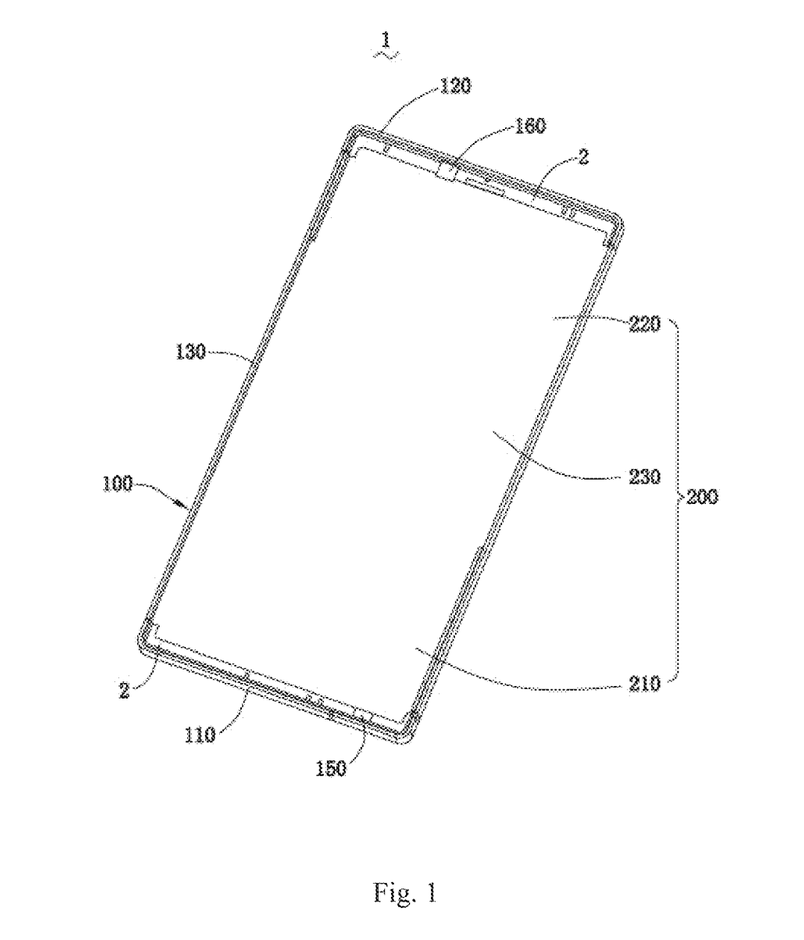
FIG. 1 is a schematic perspective structural view illustrating an antenna system according to the present disclosure.
Figure 2:
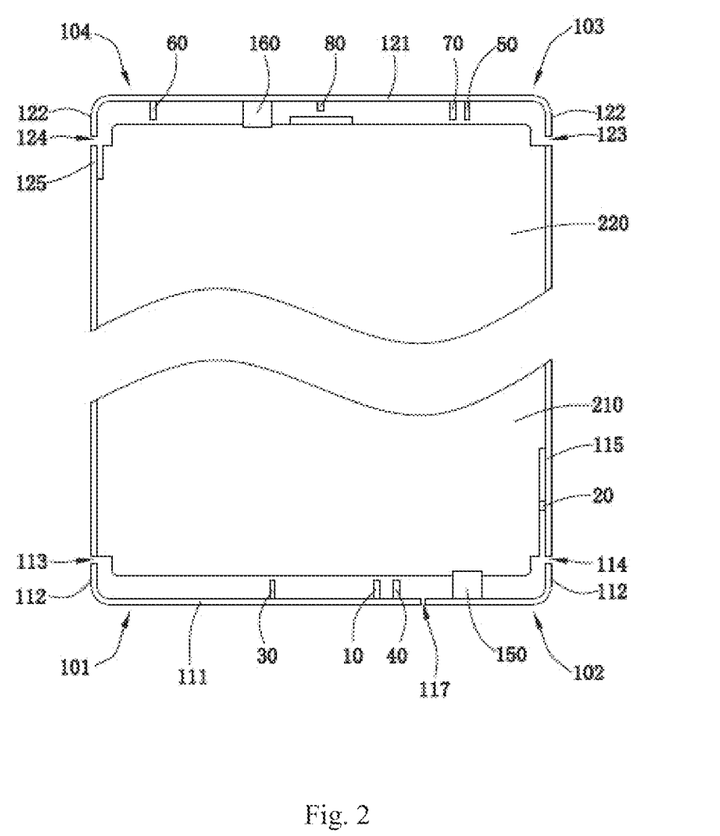
FIG. 2 is a schematic structural view of the antenna system shown in FIG. 1 illustrating the connection of the bottom frame and the first circuit board and the connection of the top frame and the second circuit board.
Figure 3:
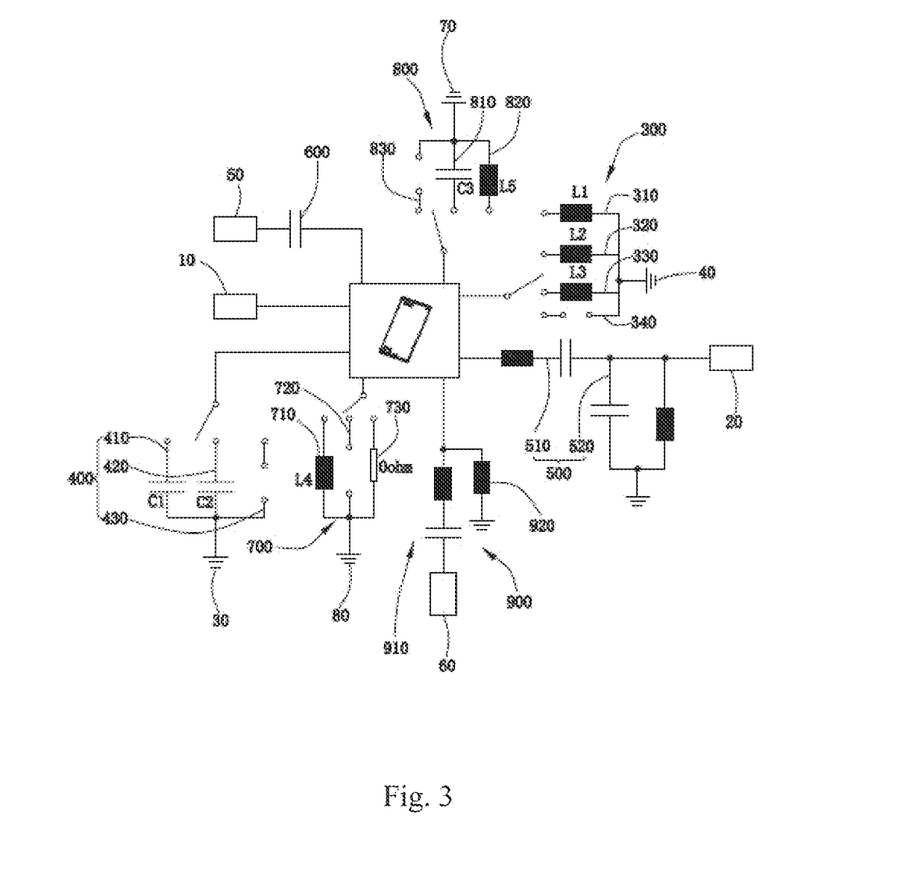
FIG. 3 is a schematic structural view of the circuit connection of a specific embodiment of the antenna system shown in FIG. 1.

As shown in FIG. 1 to FIG. 3, an embodiment of the present disclosure provides an antenna system 1 that could be applied to mobile terminals such as mobile phones and tablets. The antenna system 1 comprises a metal frame 100, a main board 200 received in the metal frame 100, a first feeding point 10, a second feeding point 20, a first grounding point 30, a second grounding points 40, a third feeding point 50, a fourth feeding point 60, a third grounding point 70, and a fourth grounding point 80 disposed at the main board 200.

The metal frame 100 comprises a bottom frame 110, a top frame 120, a middle frame 130 having two ends respectively connected to the bottom frame 110 and the top frame 120, a first connecting rib 150 connecting the bottom frame 110 and the main board 200, and a second connecting rib 160 connecting the top frame 120 and the main board 200.

The bottom frame 110 is disposed opposite to the top frame 120, the bottom frame 110, the middle frame 130, and the top frame 120 are sequentially connected to form a complete structure of the metal frame 100, and all the three frames are disposed to surround the main board 200. Specifically, the bottom frame 110 and the main board 200 are disposed apart to form a clearance area less than or equal to 4 mm, and the bottom frame 110 is connected to the main board 200 through the first connecting rib 150. The top frame 120 and the main board 200 are disposed apart to form a clearance area less than or equal to 4 mm. The top frame 120 is connected to the main board 200 through the second connecting rib 160. There is no gap between the middle frame 130 and the main board 200, and the inner side of the middle frame 130 is connected to an edge of the main board 200.

The bottom frame 110 comprises a first main frame 111, two first side frames 112 respectively crookedly extending from two ends of the first main frame 111 in a direction approaching the middle frame 130, a first slit 113 and a second slit 114 respectively disposed at ends of the two first side frames, a first extending portion 115 extending from an end of the second slit 114 away from the first side frame 112 in the direction approaching the middle frame 130, and a fracture 117 disposed at the first main frame 111 and adjacent to the second slit 114. The first slit 113 and the second slit 114 are symmetrically arranged about an axis of symmetry parallel to the longitudinal direction of the metal frame 100. The first extending portion 115 is connected to the middle frame 130 and the distance between the first extending portion 115 and the main board 200 is smaller than the distance between other portions of the bottom frame 110 and the main board 200, that is, the clearance area between the first extending portion 115 and the main board 200 is smaller than the clearance area between other portions of the bottom frame 110 and the main board 200.

A part of the bottom frame 110 extending from the fracture 117 to the first slit 112 is the first radiating portion 101, and a part of the bottom frame 110 extending from the fracture 117 to the first extending portion 115 is the second radiating portion 102.

The top frame 120 comprises a second main frame 121 disposed rightly opposite to the first main frame 111, two second side frames 122 crookedly extending from two ends of the second main frame 121 in a direction approaching the middle frame 130, a third slit 123 and a fourth slit 124 respectively disposed at ends of the two second side frames 122, and a second extending portion 125 extending from an end of the fourth slit 124 away from the second side frame 122 in a direction approaching the middle frame 130. The third slit 123 and the fourth slit 124 are symmetrically arranged about an axis of symmetry parallel to the longitudinal direction of the metal frame 100. The second extending portion 125 is connected to the middle frame 130 and the distance between the second extending portion 125 and the main board 200 is smaller than the distance between other portions of the top frame 120 and the main board 200, that is, the clearance area between the second extending portion 125 and the main board 200 is smaller than the clearance area between other portions of the top frame 110 and the main board 200.

The third slit 123 and the second slit 114 are symmetrically arranged about an axis of symmetry parallel to the width direction of the metal frame 100, and the fourth slit 124 and the first slit 113 are symmetrically arranged about an axis of symmetry parallel to the width direction of the metal frame 100.

A part of the top frame 120 extending from the second connecting rib 160 to the third slit 123 is the third radiating portion 103, and a part of the top frame 120 extending from the second connecting rib 160 to the second extending portion 124 is the fourth radiating portion 104.

Further, the clearance area between the top frame 120 and the main board 200, the clearance area between the bottom frame 110 and the main board 200, the first slit 113, the second slit 114, the third slit 123, the fourth slit 124, and the fracture 117 are filled with a non-conductive material 2.

The main board 200 comprises a first main board 210 adjacent to the bottom frame 110, a second main board 220 adjacent to the top frame 120, and a connecting main board 230 for connecting the first main board 210 and the second main board 220. The first main board 210, the second main board 220, and the connecting main board 230 are integrally molded. In other embodiments, the first main board 210 and the second main board 220 may be provided separately. The first main board 210 and the second main board 220 may be PCB circuit boards, and the connecting main board 230 may be a metal middle frame.

The first feeding point 10, the second feeding point 20, the first grounding point 30 and the second grounding point 40 are disposed at the first main board 210. Specifically, the second grounding point 40 is disposed adjacent to the fracture 117, the first feeding point 10 is located between the first grounding point 30 and the second grounding point 40 and disposed adjacent to the second grounding point 40, the second slit 114 is located between the second feeding point 20 and the fracture 117, and the first connection rib 150 is connected to the second radiating portion 102 and disposed adjacent to the fracture 117.

The first feeding point 10 is electrically connected to the first radiating portion 101, the second grounding point 40 is electrically connected to the first radiating portion 101 through a first tuning switch (SW1) 300, and the first grounding point 30 is electrically connected to the first radiating portion 101 through a second tuning switch (SW2) 400. The first radiating portion 101, the first feeding point 10, the first grounding point 30, the second grounding point 40, the first tuning switch (SW1) 300, and the second tuning switch (SW2) 400 collectively constitute a first antenna.

Further, the first tuning switch (SW1) 300 is provided with a first inductor accessing state 310, a second inductor accessing state 320, a third inductor accessing state 330, and an open state 340. Specifically, if the first tuning switch 300 is in the first inductor accessing state 310, the first radiating portion 101 is connected to the second grounding point 40 through a first inductor L1; if the first tuning switch 300 is in the second inductor accessing state 320, the first radiating portion 101 is connected to the second grounding point 40 through a second inductor L2; if the first tuning switch 300 is in the third inductor accessing state 330, the first radiating portion 101 is connected to the second grounding point 40 through a third inductor L3; and if the first tuning switch 300 is in the open state, the first radiating portion 101 is electrically isolated from the second grounding point 40. The inductance value of the first inductor L1, the second inductor L2, and the third inductor L3 are 1.5 nH, 2.2 nH, and 5 nH, respectively.

Figure 4:
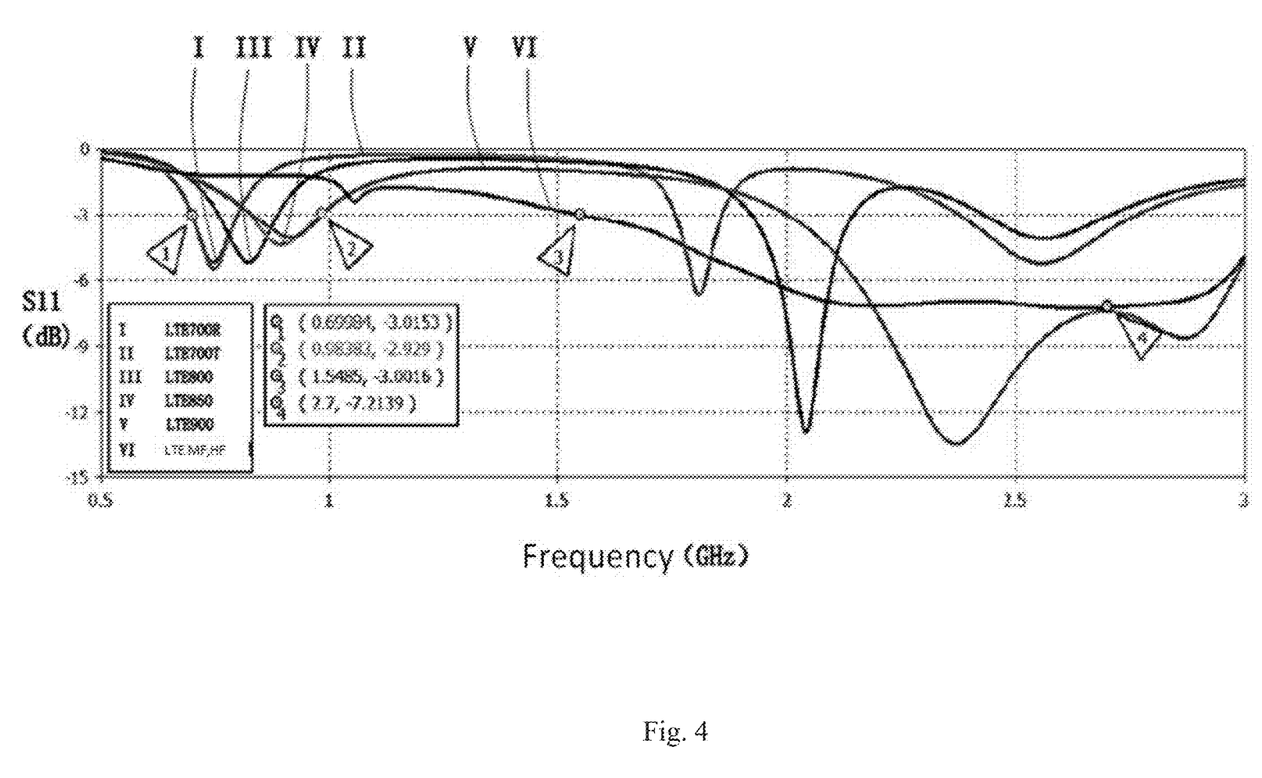
FIG. 4 is a graph illustrating the simulation effect of return loss of the first antenna in the antenna system according to the present disclosure.
Figure 5:
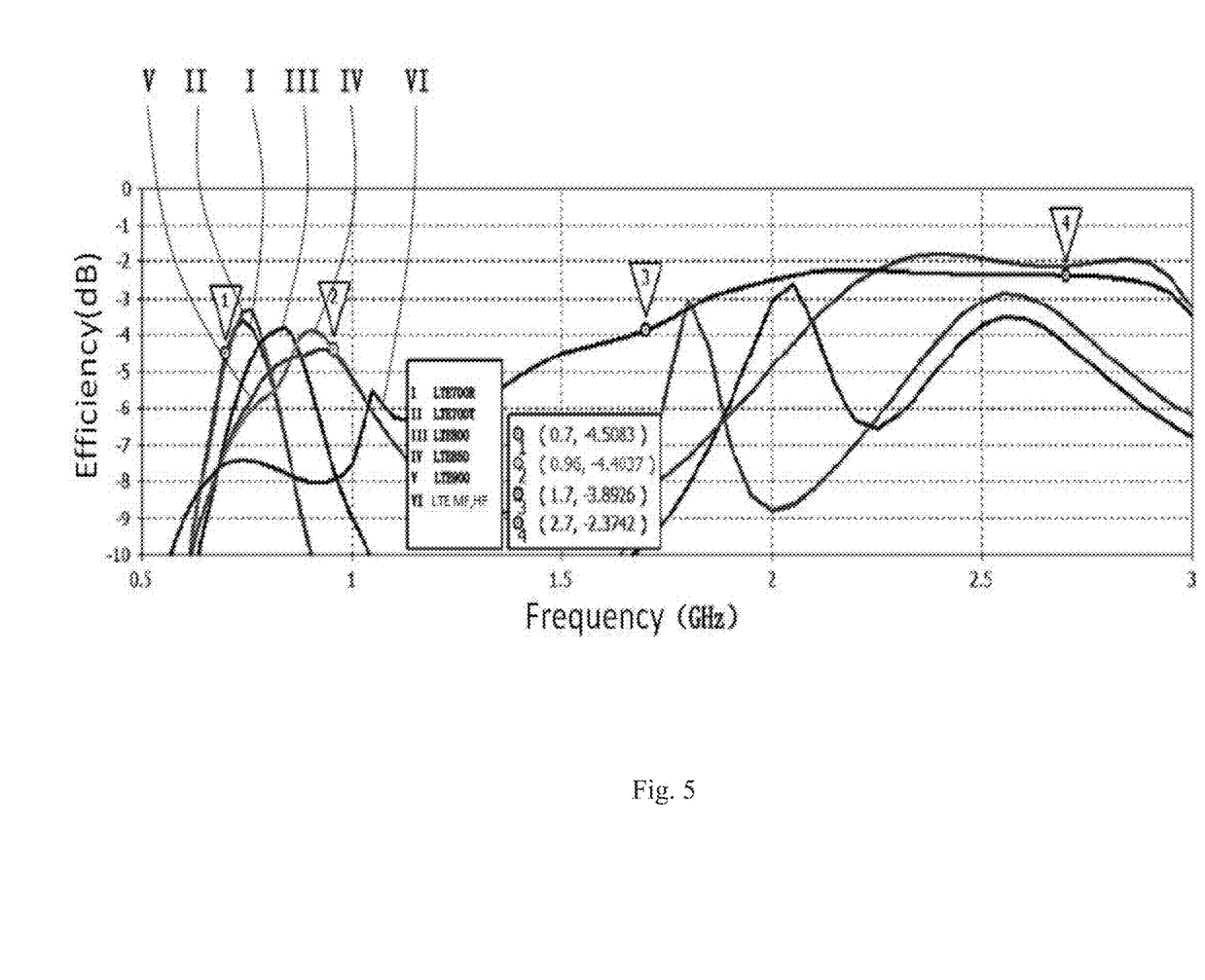
FIG. 5 is a graph illustrating the simulation effect of radiation efficiency of the first antenna in the antenna system according to the present disclosure.

The second tuning switch (SW2) 400 is provided with a first capacitor accessing state 410, a second capacitor accessing state 420, and an open state 430. Where, if the second tuning switch 400 is in the first capacitor accessing state 410, the first radiating portion 101 is connected to the first grounding point 30 through a first capacitor C1; if the second tuning switch is in the second capacitor accessing state 420, the first radiating portion 101 is connected to the first grounding point 30 through a second capacitor C2; and if the second tuning switch is in the open state 430, the first radiating portion 101 is electrically isolated from the first grounding point 30. The first capacitor C1 and the second capacitor C2 are capacitors with constant capacitance values of 0.8 pF and 1.5 pF, respectively. In this embodiment, the return loss and efficiency of the first antenna at respective operating frequency bands are shown in FIGS. 4 and 5.

The second feeding point 20 is electrically connected to the second radiating portion 102 through a first matching network 500, and the second radiating portion 102 is grounded through the first connecting rib 150. The second radiating portion 102, the second feeding point 20, the first matching network 500, and the first connecting rib 150 collectively constitute a second antenna.

Figure 6:
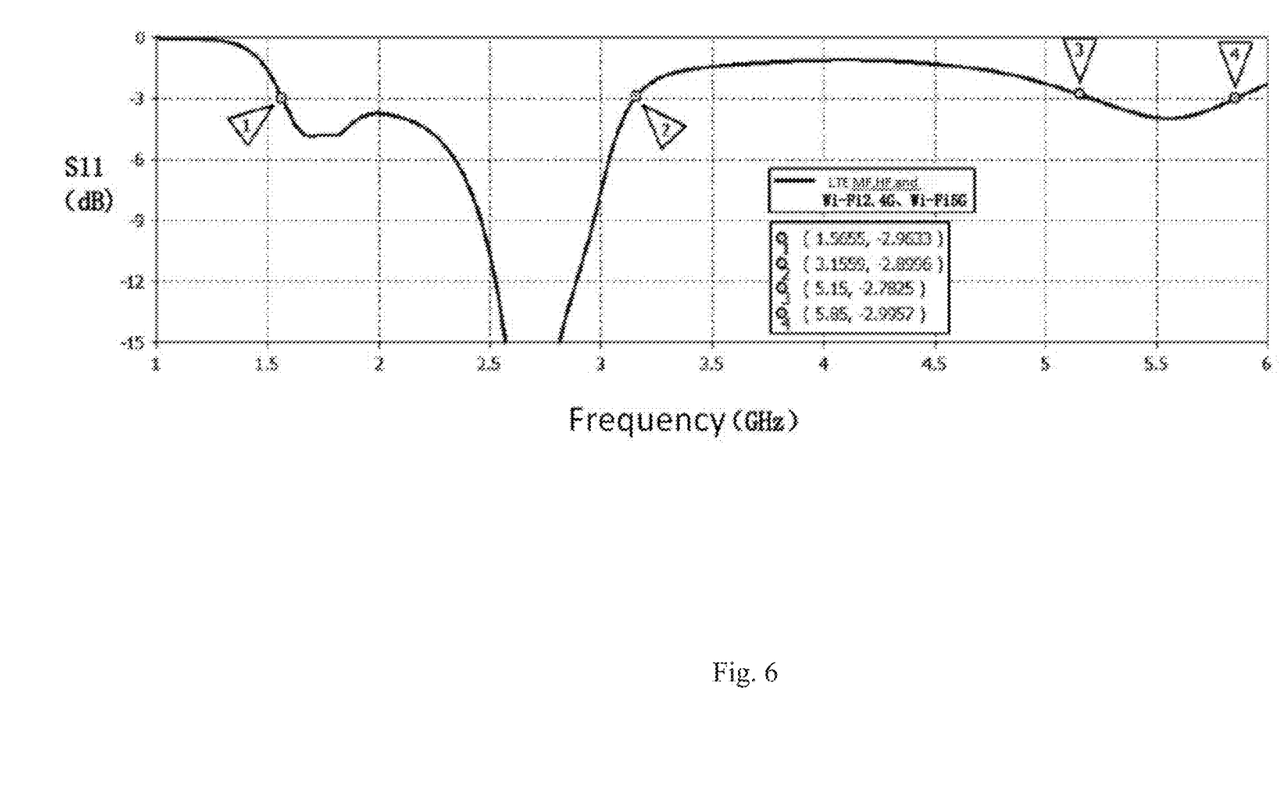
FIG. 6 is a graph illustrating the simulation effect of return loss of the second antenna in the antenna system according to the present disclosure.
Figure 7:
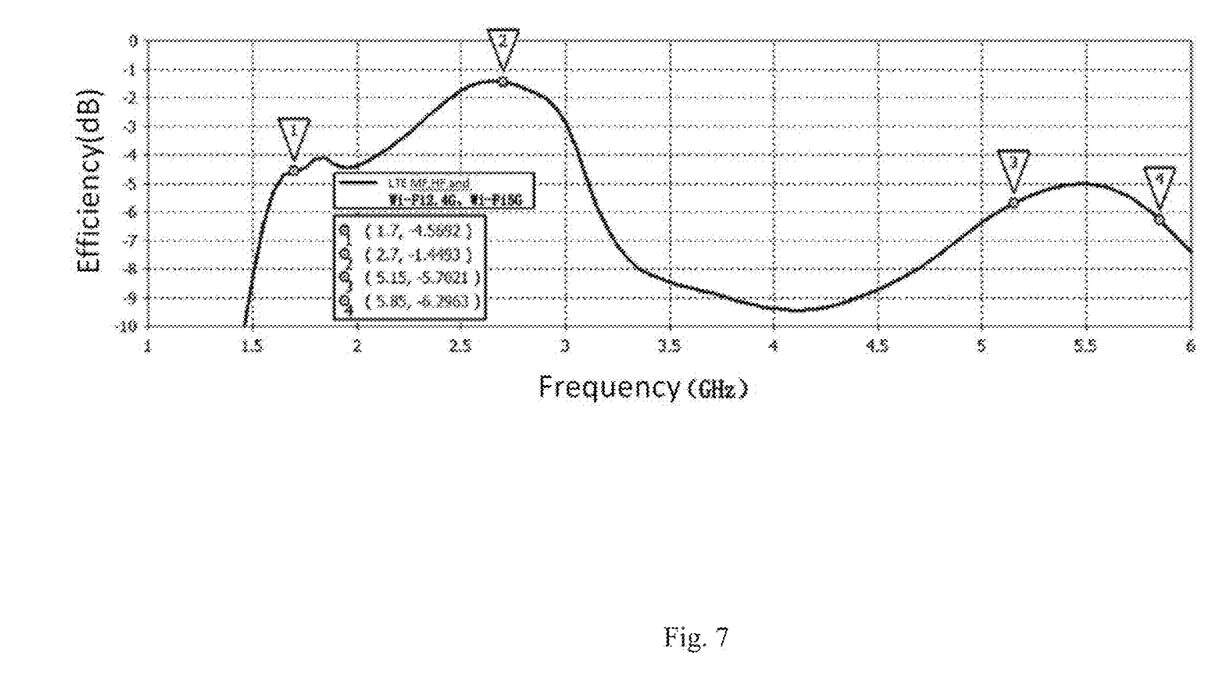
FIG. 7 is a graph illustrating the simulation effect of radiation efficiency of the second antenna in the antenna system according to the present disclosure.

The first matching network 500 comprises a first matching element 510 with one end connected to the second radiating portion 102 and another end connected to the second feeding point 20, and a second matching element 520 with one end connected to the second feeding point 20 and another end grounded. The first matching element 510 comprises a capacitor and an inductor connected in series. The second matching element 520 comprises a capacitor and an inductor connected in parallel. In this embodiment, the return loss and efficiency of the second antenna at respective operating frequency bands are as shown in FIGS. 6 and 7.

The third feeding point 50, the fourth feeding point 60, the third grounding point 70, and the fourth grounding point 80 are disposed at the second main board 220. The fourth feeding point 60 is located between the second connecting rib 160 and the fourth slit 124, the second connecting rib 160 is located between the fourth feeding point 60 and the fourth grounding point 80 and is disposed adjacent to the fourth grounding point 80, and the third grounding point 70 is located between the fourth grounding point 80 and the third feeding point 50 and is disposed adjacent to the third feeding point 50.

The third feeding point 50 is electrically connected to the third radiating portion 103 through a variable capacitor (tunner) 600, the fourth grounding point 80 is electrically connected to the third radiating portion 103 through a third tuning switch (SW3) 700, the third grounding point 70 is electrically connected to the third radiating portion 103 through a fourth tuning switch (SW4) 800, and the third radiating portion 103 is grounded through the second connecting rib 160. The third radiating portion 103, the third feeding point 50, the variable capacitor (tunner) 600, the second connecting rib 160, the third tuning switch (SW3) 700, and the fourth tuning switch (SW4) 800 collectively constitute a third antenna.

Further, the third tuning switch (SW3) 700 is provided with a fourth inductor accessing state 710, an open state 720, and a short circuit state 730. Where, if the third tuning switch 700 is in the fourth inductor accessing state 710, the third radiating portion 103 is connected to the fourth grounding point 80 through a fourth inductor; if the third tuning switch is in the open state 720, the third radiating portion 103 is electrically isolated from the fourth grounding point 80; and if the third tuning switch is in the short circuit state 730, the third radiating portion 103 is connected to the fourth grounding point 80 through a resistor with resistance value of 0 ohm. The inductance value of the fourth inductor L4 is 16 nH.

Figure 8:
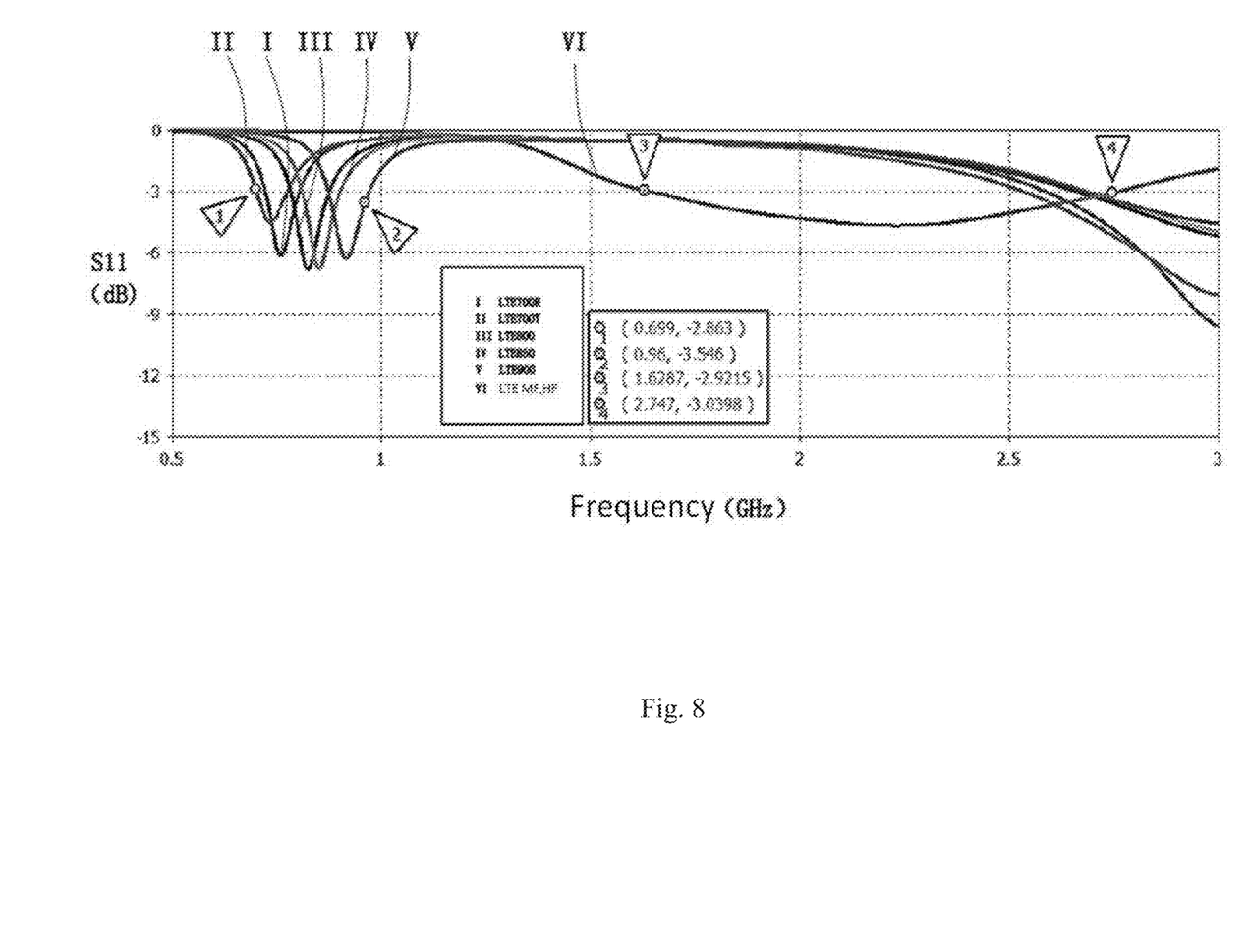
FIG. 8 is a graph illustrating the simulation effect of return loss of the third antenna in the antenna system according to the present disclosure.
Figure 9:
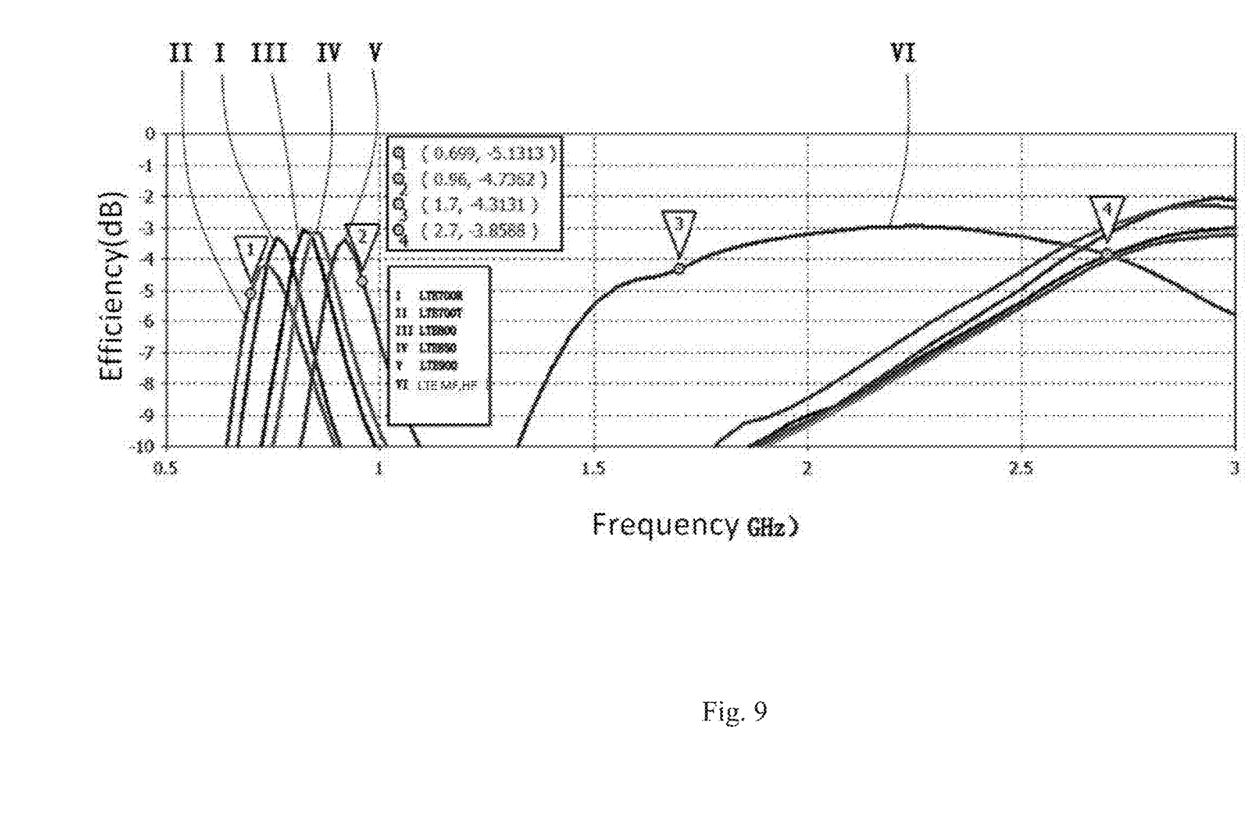
FIG. 9 is a graph illustrating the simulation effect of radiation efficiency of the third antenna in the antenna system according to the present disclosure.

The fourth tuning switch (SW4) 800 is provided with a fifth inductor accessing state 810, a third capacitor accessing state 820, and an open state 830. Where, if the fourth tuning switch 800 is in the fifth inductor accessing state 810, the third radiating portion 103 is connected to the third grounding point 70 through the fifth inductor L5; if the fourth tuning switch is in the third capacitor accessing state 820, the third radiating portion 103 is connected to the third grounding point 70 through the third capacitor C3; and if the fourth tuning switch is in the open state 830, the third radiating portion 103 is electrically isolated from the third grounding point 70. The fifth inductor L5 has a inductance value of 1.2 nH, and the third capacitor C3 has a capacitance value of 0.3 pF. In this embodiment, the return loss and efficiency of the third antenna at respective operating frequency bands are shown in FIGS. 8 and 9.

The fourth feeding point 60 is electrically connected to the fourth radiating portion 104 through a second matching network 900, and the fourth radiating portion 104 is grounded through the second connecting rib 160. The fourth radiating portion 104, the fourth feeding point 60, the second matching network 900, and the second connecting rib 160 collectively constitute a fourth antenna.

Figure 10:
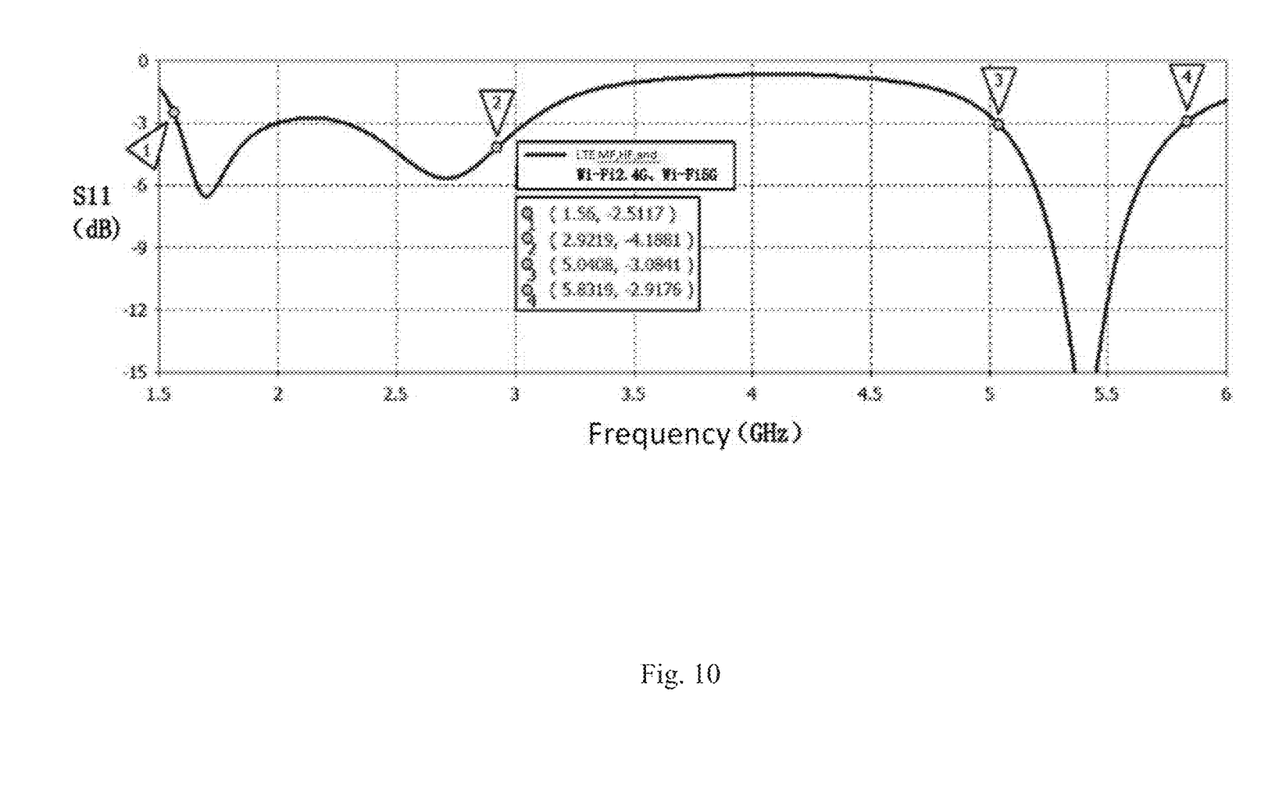
FIG. 10 is a graph illustrating the simulation effect of return loss of the fourth antenna in the antenna system according to the present disclosure.
Figure 11:
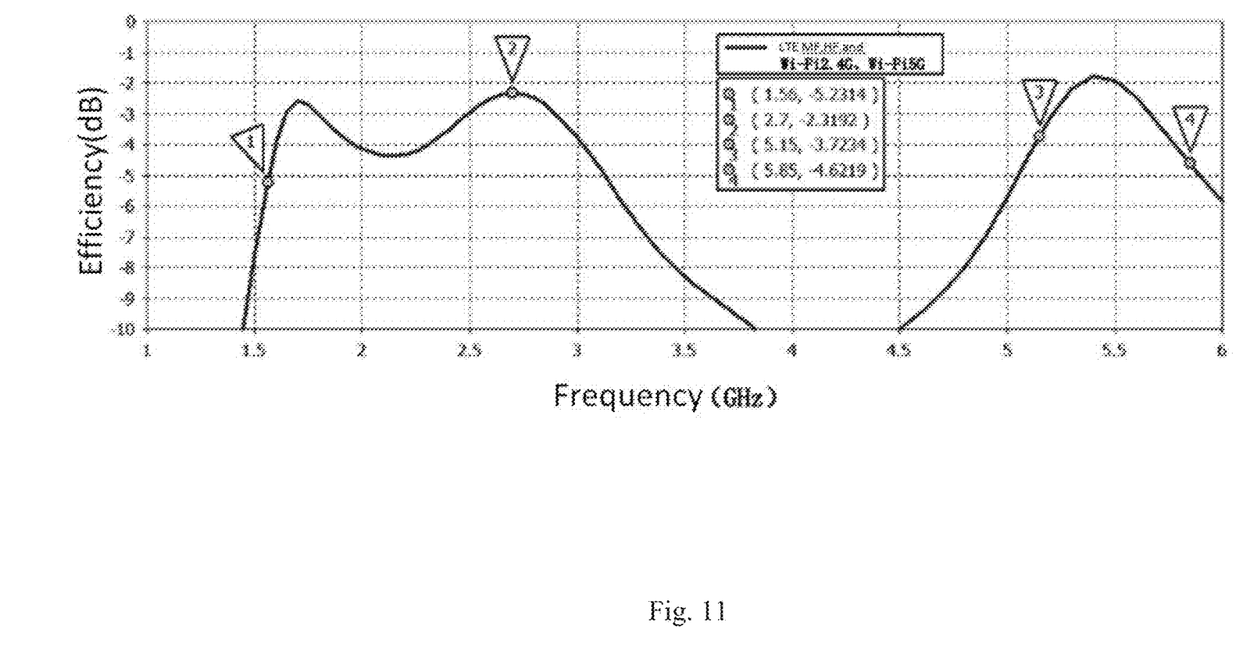
FIG. 11 is a graph illustrating the simulation effect of radiation efficiency of the fourth antenna in the antenna system according to the present disclosure.

Further, the second matching network 900 comprises a third matching element 910 with one end connected to the fourth radiating portion 104 and another end connected to the fourth feeding point 60, and a fourth matching element 920 with one end connected to the fourth radiating portion 104 and another end grounded. The third matching element 910 comprises a capacitor and an inductor connected in series. In this embodiment, the capacitance value is 0.7 pF and the inductance value is 3 nH. The fourth matching element 920 is an inductor, and in this embodiment, the inductance value is 3 nH. In this embodiment, the return loss and efficiency of the fourth antenna at respective operating frequency bands are shown in FIGS. 10 and 11.

Embodiments in which the antenna system 100 of the present disclosure implements different frequency bands of LTE and Wi-Fi by adjusting respective tuning switches and variable capacitors are shown as follows:

| FREQUENCY | SW1 | SW2 | Tuner | SW3 | SW4 |
|---|---|---|---|---|---|
| LTE700T (699-746 MHz) | 1.5 nH | 1.5 pF | 1.3 pF | open | 0.3 pF |
| LTE700R (746-803 MHz) | | | 1.1 pF | open | 0.3 pF |
| LTE800 (791-862 MHz) | 2.2 nH | 0.8 pF | 0.95 pF | open | open |
| LTE850 (824-894 MHz) | 5 nH | open | 0.9 pF | 16 nH | open |
| LTE900 (880-960 MHz) | | | 0.9 pF | 0 ohm | open |
| LTE MF, HF& Wi-Fi2.4G, Wi-Fi5G (1710-2690 MHz/ 2400-2500 MHz/ 5150-5850 MHz) | open | open | 1.8 pF | 0 ohm | 1.2 nH |

Specifically:

1) If the antenna system operates at LTE 700T (699-746 MHz), the first radiating portion is electrically connected to the second grounding point through an inductor with an inductance value of 1.5 nH, the first radiating portion is electrically connected to the first grounding point through a capacitor with a capacitance value of 1.5 pF, the third radiating portion is electrically connected to the third feeding point through a variable capacitor with a capacitance value of 1.3 pF, the third radiating portion is electrically isolated from the fourth grounding point, and the third radiating portion is electrically connected to the third grounding point through a capacitor with a capacitance value of 0.3 pF;

2) If the antenna system operates at LTE 700R (746-803 MHz), the first radiating portion is electrically connected to the second grounding point through an inductor with an inductance value of 1.5 nH, the first radiating portion is electrically connected to the first grounding point through a capacitor with a capacitance value of 1.5 pF, the third radiating portion is electrically connected to the third feeding point through a variable capacitor with a capacitance value of 1.1 pF, the third radiating portion is electrically isolated from the fourth grounding point, and the third radiating portion is electrically connected to the third grounding point through a capacitor with a capacitance value of 0.3 pF.

3) If the antenna system operates at LTE 800 (791-862 MHz), the first radiating portion is electrically connected to the second grounding point through an inductor with an inductance value of 2.2 nH, the first radiating portion is electrically connected to the first grounding point through a capacitor with a capacitance value of 0.8 pF, the third radiating portion is electrically connected to the third feeding point through a variable capacitor with a capacitance value of 0.95 pF, the third radiating portion is electrically isolated from the fourth grounding point, and the third radiating portion is electrically isolated from the third grounding point.

4) If the antenna system operates at LTE 850 (824-894 MHz), the first radiating portion is electrically connected to the second grounding point through an inductor with an inductance value of 5 nH, the first radiating portion is electrically isolated from the first grounding point, the third radiating portion is electrically connected to the third feeding point through a variable capacitor with a capacitance value of 0.9 pF, the third radiating portion is electrically connected to the fourth grounding point through an inductor with an inductance value of 16 nH, and the third radiating portion is electrically isolated from the third grounding point.

5) If the antenna system operates at LTE 900 (880-960 MHz), the first radiating portion is electrically connected to the second grounding point through an inductor with an inductance value of 5 nH, the first radiating portion is electrically isolated from the first grounding point, the third radiating portion is electrically connected to the third feeding point through a variable capacitor with a capacitance value of 0.9 pF, the third radiating portion is electrically connected to the fourth grounding point through a resistor with resistance value of 0 ohm, and the third radiating portion is electrically isolated from the third grounding point.

6) when the antenna system operates at LTE medium and high frequency (HF), and Wi-Fi 2.4G, Wi-Fi 5G (1710-2690 MHz, 2400-2500 MHz, and 5150-5850 MHz), the first radiating portion is electrically isolated from the second grounding point, the first radiating portion is electrically isolated from the first grounding point, the third radiating portion is electrically connected to the third feeding point through a variable capacitor having a capacitance value with a capacitance value of 1.8 pF, the third radiating portion is electrically connected to the fourth grounding point through a resistor with resistance value of 0 ohm, and the third radiating portion is electrically connected to the third grounding point through an inductor having an inductance value with an inductance value of 1.2 nH.

Figure 12:
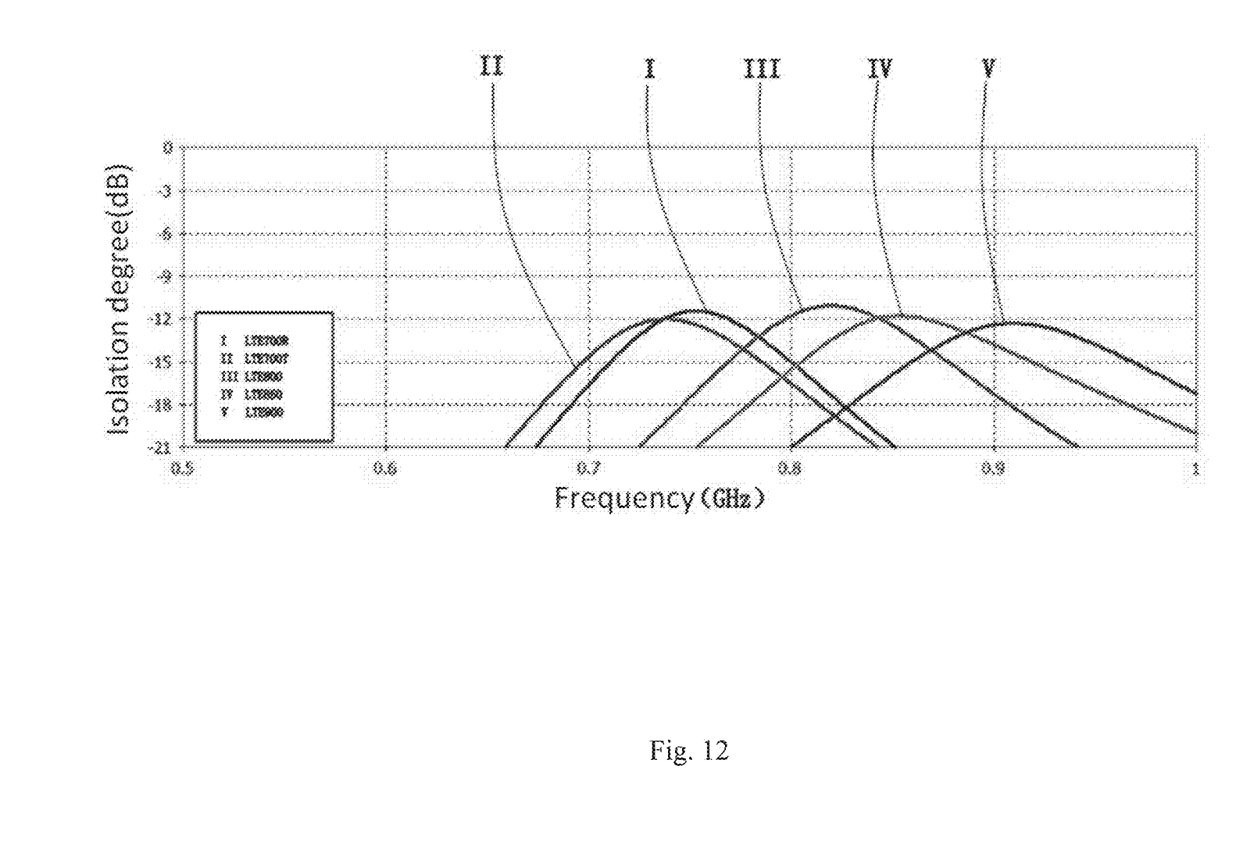
FIG. 12 is a graph illustrating the simulation on an isolation degree of the first antenna and the third antenna of the antenna system according to the present disclosure.
Figure 13:
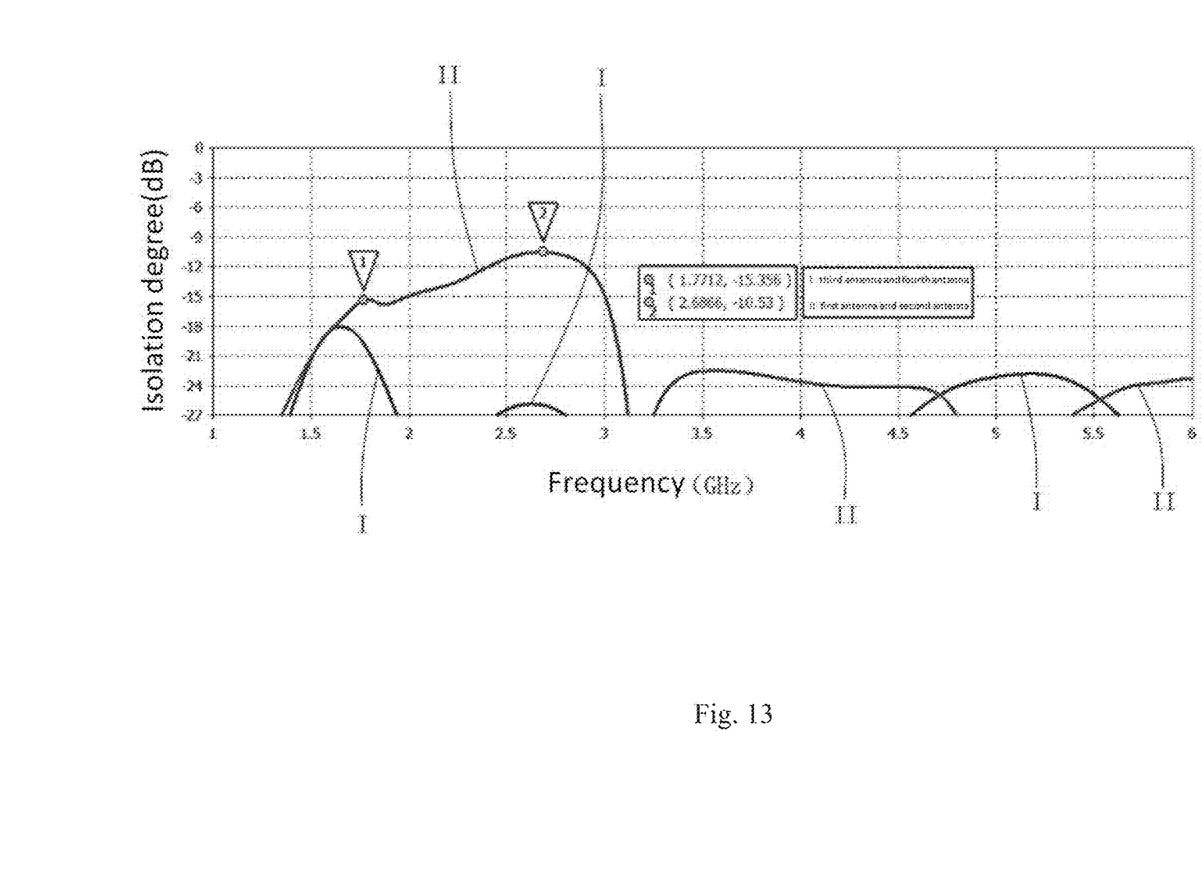
FIG. 13 is a graph showing the simulation on an isolation degree of the third antenna and the fourth antenna and an isolation degree of the first antenna and the second antenna of the antenna system according to the present disclosure.

FIGS. 12 and 13 depict graphs illustrating simulation of isolation degree between antennas of the antenna system provided by the present disclosure.

From above, in the antenna system 100, a first antenna is formed by feeding through the first feeding point, a second antenna is formed by feeding through the second feeding point, a third antenna is formed by feeding through the third feeding point, and a fourth antenna is formed by feeding through the fourth feeding point. The first antenna and the third antenna both have an operating frequency that could cover LTE low frequency and they cooperate to construct a 2×2 MIMO mechanism (system) operating at LTE low frequency, and the specific frequency band is 699-960 MHz; the first antenna, the second antenna, the third antenna, and the fourth antenna all have an operating frequency that can cover LTE medium and high frequency and they cooperate to construct a 4×4 MIMO mechanism operating at LTE medium and high frequency, and the specific frequency band is 1710-2690 MHz; the second antenna and the fourth antenna both have an operating frequency that can cover Wi-Fi 2.4G and Wi-Fi 5G and they cooperate to construct a 2×2 MIMO mechanism operating at Wi-Fi 2.4G and Wi-Fi 5G, and the specific frequency bands are 2400-2500 MHz and 5150-5850 MHz.

In the present embodiment, the first antenna operates as a LTE primary antenna, and the third antenna operates as a LTE diversity antenna. The operating frequency of the fourth antenna may also cover the mainstream frequency band of GNSS.

The present disclosure also provides a mobile terminal which comprises the technical features of the antenna system described above. Of course, the above technical effects could be obtained by applying the antenna system. The mobile terminal has a size of 80 mm×160 mm and a 3D glass screen.

Compared with the prior art, in the antenna system provided by the present disclosure, the bottom frame is partitioned by the fracture into a first radiating portion and a second radiating portion, and the top frame is partitioned by a connecting point of the second connecting rib with the top frame into a third radiating portion and a fourth radiating portion, the first feeding point is electrically connected to the first radiating portion, the second grounding point is electrically connected to the first radiating portion through a first tuning switch, and the first grounding point is electrically connected to the first radiating portion through a second tuning switch, thus forming a first antenna; the second feeding point is electrically connected to the second radiating portion through a first matching network, and the second radiating portion is grounded through the first connecting rib, thus forming a second antenna; the third feeding point is electrically connected to the third radiating portion through a variable capacitor (tunner), the fourth grounding point is electrically connected to the third radiating portion through a third tuning switch, the third grounding point is electrically connected to the third radiating portion through a fourth tuning switch, and the third radiating portion is grounded through the second connecting rib, thus forming a third antenna; the fourth feeding point is electrically connected to the fourth radiating portion through a second matching network, and the fourth radiating portion is grounded through the second connecting rib, thus forming a fourth antenna; such that the antenna system implements a 2×2 MIMO mechanism at LTE low frequency, a 4×4 MIMO mechanism at LTE medium and high frequency, a 2×2 MIMO mechanism at Wi-Fi 2.4G and Wi-Fi 5G, and the antenna system simultaneously supports the mainstream frequency band of GNSS, thus a better communication performance is achieved. Moreover, the antennas in the antenna system are arranged on the upper, lower, left and right sides of a terminal, such that the signal accessing strength can be ensured in both cases of horizontal screen and vertical screen.

The above is only embodiments of the present disclosure, and it should be noted that those skilled in the art can make improvements without departing from the concept of the present disclosure, but these improvements all fall in the protection range of the present disclosure.

What is claimed is:

1. An antenna system comprising a metal frame and a main board received in the metal frame, wherein, the metal frame comprises a bottom frame and a top frame surrounding the main board and forming a clearance area with the main board, respectively, a fracture disposed at the bottom frame, a first connecting rib for connecting the bottom frame and the main board, and a second connecting rib for connecting the top frame and the main board; the top frame and the bottom frame are disposed apart and opposite to each other, the bottom frame comprises a first radiating portion and a second radiating portion partitioned by the fracture, the top frame comprises a third radiating portion and a fourth radiating portion partitioned by a connecting point of the second connecting rib with the top frame, the first radiating portion and the third radiating portion are diagonally disposed, the second radiating portion and the fourth radiating portion are diagonally disposed, wherein, the main board comprises a first main board adjacent to the bottom frame and a second main board adjacent to the top frame, the antenna system comprises a first feeding point, a second feeding point, a first grounding point, and a second grounding point, a first tuning switch, a second tuning switch, and a first matching network disposed at the first main board; and a third feeding point, a fourth feeding point, a third grounding point, a fourth grounding point, a variable capacitor, a third tuning switch, a fourth tuning switch, and a second matching network disposed at the second main board; wherein, the first feeding point is electrically connected to the first radiating portion, the second grounding point is electrically connected to the first radiating portion through the first tuning switch, and the first grounding point is electrically connected to the first radiating portion through the second tuning switch;

the second feeding point is electrically connected to the second radiating portion through the first matching network, and the second radiating portion is grounded through the first connecting rib;

the third feeding point is electrically connected to the third radiating portion through the variable capacitor, the fourth grounding point is electrically connected to the third radiating portion through the third tuning switch, and the third grounding point is electrically connected to the third radiating portion through the fourth tuning switch;

the fourth feeding point is electrically connected to the fourth radiating portion through the second matching network; and the third radiating portion and the fourth radiating portion are grounded through the second connecting rib.

2. The antenna system according to claim 1, wherein a first antenna is formed by feeding through the first feeding point, a second antenna is formed by feeding through the second feeding point, a third antenna is formed by feeding through the third feeding point, and a fourth antenna is formed by feeding through the fourth feeding point; and both the first antenna and the third antenna have an operating frequency that covers LTE low frequency and they cooperate to construct a 2×2 MIMO mechanism operating at the LTE low frequency; all of the first antenna, the second antenna, the third antenna, and the fourth antenna have an operating frequency that covers LTE medium frequency and high frequency and they cooperate to construct a 4×4 MIMO mechanism operating at the LTE medium frequency and high frequency; both the second antenna and the fourth antenna have an operating frequency that covers Wi-Fi 2.4G and Wi-Fi 5G and they cooperate to construct a 2×2 MIMO mechanism operating at the Wi-Fi 2.4G and Wi-Fi 5G; and the fourth antenna has an operating frequency that further covers the mainstream frequency band of GNSS.

3. The antenna system according to claim 1, wherein the first tuning switch is provided with a first inductor accessing state, a second inductor accessing state, a third inductor accessing state, and an open state, and when the first tuning switch operates in different operating states, the first radiating portion is connected to the second grounding point by one of the first inductor, the second inductor and the third inductor, or the first radiating portion is electrically isolated from the second grounding point;

the second tuning switch is provided with a first capacitor accessing state, a second capacitor accessing state, and an open state, and when the second tuning switch operates in different operating states, the first radiating portion is connected to the first grounding point by one of the first capacitor and the second capacitor, or the first radiating portion is electrically isolated from the first grounding point;

the third tuning switch is provided with a fourth inductor accessing state, an open state, and a short circuit state, and when the third tuning switch operates in different operating states, the third radiating portion is connected to the fourth grounding point by the fourth inductor or a resistor with resistance value of 0 ohm, or the third radiating portion is electrically isolated from the fourth grounding point; and the fourth tuning switch is provided with a fifth inductor accessing state, a third capacitor accessing state, and an open state, and when the fourth tuning switch is in different operating states, the third radiating portion is connected to the third grounding point by one of the fifth inductor and the third capacitor, or the third radiating portion is electrically isolated from the third grounding point.

4. The antenna system according to claim 1, wherein the first matching network comprises a first matching element with one end connected to the second radiating portion and another end connected to the second feeding point, and a second matching element with one end connected to the second radiating portion and another end grounded; the first matching element comprises a capacitor and an inductor connected in series, and the second matching element comprises a capacitor and an inductor connected in parallel.

5. The antenna system according to claim 1, wherein the second matching network comprises a third matching element with one end connected to the fourth radiating portion and another end connected to the fourth feeding point, and a fourth matching element with one end connected to the fourth radiating portion and another end grounded; the third matching element comprises a capacitor and an inductor connected in series, and the fourth matching element is an inductor.

6. The antenna system according to claim 1, wherein the bottom frame comprises a first main frame, two first side frames crookedly extending from two ends of the first main frame in a direction approaching the top frame, a first slit and a second slit respectively disposed at ends of the two first side frames, and a first extending portion extending from an end of the second slit away from one of the two first side frames in a direction approaching the top frame; the fracture is disposed at the first main frame and adjacent to the second slit, a part of the bottom frame extending from the fracture to the first slit is the first radiating portion, and a part of the bottom frame extending from the fracture to the first extending portion is the second radiating portion.

7. The antenna system according to claim 2, wherein the bottom frame comprises a first main frame, two first side frames crookedly extending from two ends of the first main frame in a direction approaching the top frame, a first slit and a second slit respectively disposed at ends of the two first side frames, and a first extending portion extending from an end of the second slit away from one of the two first side frames in a direction approaching the top frame; the fracture is disposed at the first main frame and adjacent to the second slit, a part of the bottom frame extending from the fracture to the first slit is the first radiating portion, and a part of the bottom frame extending from the fracture to the first extending portion is the second radiating portion.

8. The antenna system according to claim 3, wherein the bottom frame comprises a first main frame, two first side frames crookedly extending from two ends of the first main frame in a direction approaching the top frame, a first slit and a second slit respectively disposed at ends of the two first side frames, and a first extending portion extending from an end of the second slit away from one of the two first side frames in a direction approaching the top frame; the fracture is disposed at the first main frame and adjacent to the second slit, a part of the bottom frame extending from the fracture to the first slit is the first radiating portion, and a part of the bottom frame extending from the fracture to the first extending portion is the second radiating portion.

9. The antenna system according to claim 4, wherein the bottom frame comprises a first main frame, two first side frames crookedly extending from two ends of the first main frame in a direction approaching the top frame, a first slit and a second slit respectively disposed at ends of the two first side frames, and a first extending portion extending from an end of the second slit away from one of the two first side frames in a direction approaching the top frame; the fracture is disposed at the first main frame and adjacent to the second slit, a part of the bottom frame extending from the fracture to the first slit is the first radiating portion, and a part of the bottom frame extending from the fracture to the first extending portion is the second radiating portion.

10. The antenna system according to claim 5, wherein the bottom frame comprises a first main frame, two first side frames crookedly extending from two ends of the first main frame in a direction approaching the top frame, a first slit and a second slit respectively disposed at ends of the two first side frames, and a first extending portion extending from an end of the second slit away from one of the two first side frames in a direction approaching the top frame; the fracture is disposed at the first main frame and adjacent to the second slit, a part of the bottom frame extending from the fracture to the first slit is the first radiating portion, and a part of the bottom frame extending from the fracture to the first extending portion is the second radiating portion.

11. The antenna system according to claim 6, wherein the second grounding point is disposed adjacent to the fracture, the first feeding point is located between the first grounding point and the second grounding point and is disposed adjacent to the second grounding point, the second slit is located between the second feeding point and the fracture, and the first connecting rib is connected to the second radiating portion and is disposed adjacent to the fracture.

12. The antenna system according to claim 6, wherein the top frame comprises a second main frame disposed rightly opposite to the first main frame, two second side frames crookedly extending from two ends of the second main frame in a direction approaching the bottom frame, a third slit and a fourth slit respectively disposed at ends of the two second side frames, and a second extending portion extending from an end of the fourth slit away from the second side frame, the third slit and the second slit are located on a same side and disposed apart and opposite to each other, the fourth slit and the first slit are located on a same side and disposed apart and opposite to each other, a part of the top frame extending from the second connecting rib to the third slit is the third radiating portion, and a part of the top frame extending from the second connecting rib to the second extending portion is the fourth radiating portion.

13. The antenna system according to claim 12, wherein the fourth feeding point is located between the second connecting rib and the fourth slit, the second connecting rib is located between the fourth feeding point and the fourth grounding point and is disposed adjacent to the fourth grounding point, and the third grounding point is located between the fourth grounding point and the third feeding point and is disposed adjacent to the third feeding point.

14. A mobile terminal comprising the antenna system as described in claim 1.

15. A mobile terminal comprising the antenna system as described in claim 2.

* * * * *